(12) United States Patent
Werner et al.

(10) Patent No.: US 9,502,985 B2
(45) Date of Patent: Nov. 22, 2016

(54) TRANSFORMER COMMUNICATION SYSTEM

(71) Applicant: Power Integrations Limited, Grand Cayman (KY)

(72) Inventors: Antonius Jacobus Johannes Werner, Cambridge (GB); Adrian Kirilov Lefedjiev, Gamlingay (GB)

(73) Assignee: POWER INTEGRATIONS LIMITED, Grand Cayman (KY)

( * ) Notice: Subject to any disclaimer, the term of this patent is extended or adjusted under 35 U.S.C. 154(b) by 2 days.

(21) Appl. No.: 14/615,862

(22) Filed: Feb. 6, 2015

(65) Prior Publication Data

US 2015/0229224 A1 Aug. 13, 2015

Related U.S. Application Data

(60) Provisional application No. 61/937,076, filed on Feb. 7, 2014.

(51) Int. Cl.
   *H02M 3/335* (2006.01)
(52) U.S. Cl.
   CPC ..... *H02M 3/33515* (2013.01); *H02M 3/33523* (2013.01); *H02M 3/33592* (2013.01); *Y02B 70/1475* (2013.01)
(58) Field of Classification Search
   CPC .................................................. H02M 3/33515
   See application file for complete search history.

(56) References Cited

U.S. PATENT DOCUMENTS

| | | |
|---|---|---|
| 5,798,913 A | 8/1998 | Tiesinga et al. |
| 5,949,659 A | 9/1999 | Lesche |
| 2005/0270001 A1 | 12/2005 | Jitaru |
| 2013/0251140 A1 | 9/2013 | Ransijn et al. |
| 2014/0112027 A1* | 4/2014 | Tseng ............... H02M 3/33592 363/21.05 |
| 2014/0204619 A1 | 7/2014 | Telefus |

(Continued)

FOREIGN PATENT DOCUMENTS

| | | |
|---|---|---|
| DE | 19520940 A1 | 12/1996 |
| DE | 102012201640 A1 | 8/2013 |

(Continued)

OTHER PUBLICATIONS

International Application No. PCT/EP2015/052596—PCT Notice of International Search Report and Written Opinion, mailed Apr. 10, 2015, pp. 1-10.

*Primary Examiner* — Emily P Pham
(74) *Attorney, Agent, or Firm* — Blakely Sokoloff Taylor & Zafman LLP (57) ABSTRACT

A switched mode power converter (SMPC) has an isolation transformer for power transfer and a communication circuit for data communication between the primary side and the secondary side. The SMPC includes a primary switch controller configured to transfer power from a primary side to a secondary side by controlling a primary switch ON for an ON time period and then controlling the primary switch OFF for an OFF time period. The primary switch controller controls the ON time period of the subsequent power transfer cycle to start a time delay after the end of the OFF time period of the previous power transfer cycle. The communication circuit comprises a magnetically coupled transmission winding and reception winding, a communication switch, and a communication controller to control the communication switch to allow charge flow through the transmission winding during at least part of the time delay for data communication.

21 Claims, 9 Drawing Sheets

(56) References Cited

U.S. PATENT DOCUMENTS

| | | |
|---|---|---|
| 2014/0204622 A1 | 7/2014 | Telefus |
| 2014/0268901 A1 | 9/2014 | Telefus |
| 2014/0268911 A1* | 9/2014 | Telefus ............. H02M 3/33523 363/21.08 |
| 2014/0268915 A1* | 9/2014 | Kong ................ H02M 3/33592 363/21.14 |
| 2014/0313794 A1* | 10/2014 | Ono .................. H02M 3/33523 363/21.15 |
| 2015/0124494 A1* | 5/2015 | Malinin ............ H02M 3/33592 363/21.14 |
| 2015/0188442 A1* | 7/2015 | Kesterson ......... H02M 3/33523 363/21.15 |

FOREIGN PATENT DOCUMENTS

| | | |
|---|---|---|
| EP | 2717450 A1 | 4/2014 |
| WO | WO 2007/005825 A2 | 1/2007 |

* cited by examiner

TRANSFORMER COMMUNICATION SYSTEM

REFERENCE TO RELATED APPLICATION

This application claims the benefit of U.S. Provisional Application No. 61/937,076, filed Feb. 7, 2014.

FIELD OF THE INVENTION

This invention generally relates to methods for transferring information between primary and secondary sides of a switched mode power converter (SMPC), SMPCs having an isolation transformer for power transfer from a primary side to a secondary side of the SMPC and having a communication circuit for data communication between the primary side and the secondary side, and more particularly to a flyback or forward converter operating in discontinuous current mode.

BACKGROUND TO THE INVENTION

In a switch mode power supply (SMPS), broadly speaking, a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly as power is drawn by the load on the output side.

An SMPS may operate in either a discontinuous conduction mode (DCM) or in continuous conduction mode (CCM) or at the boundary of the two in a critical conduction mode. In this specification we are generally concerned with DCM operating modes in which, when the switching device is turned off, the current on the secondary side of the transformer steadily, but gradually, declines until a point is reached at which substantially zero output current flows and the inductor or transformer begins to ring, entering a so-called oscillatory or idle ring phase. The period of the ringing is determined by the inductance and parasitic capacitance of the circuit.

Figure 1:
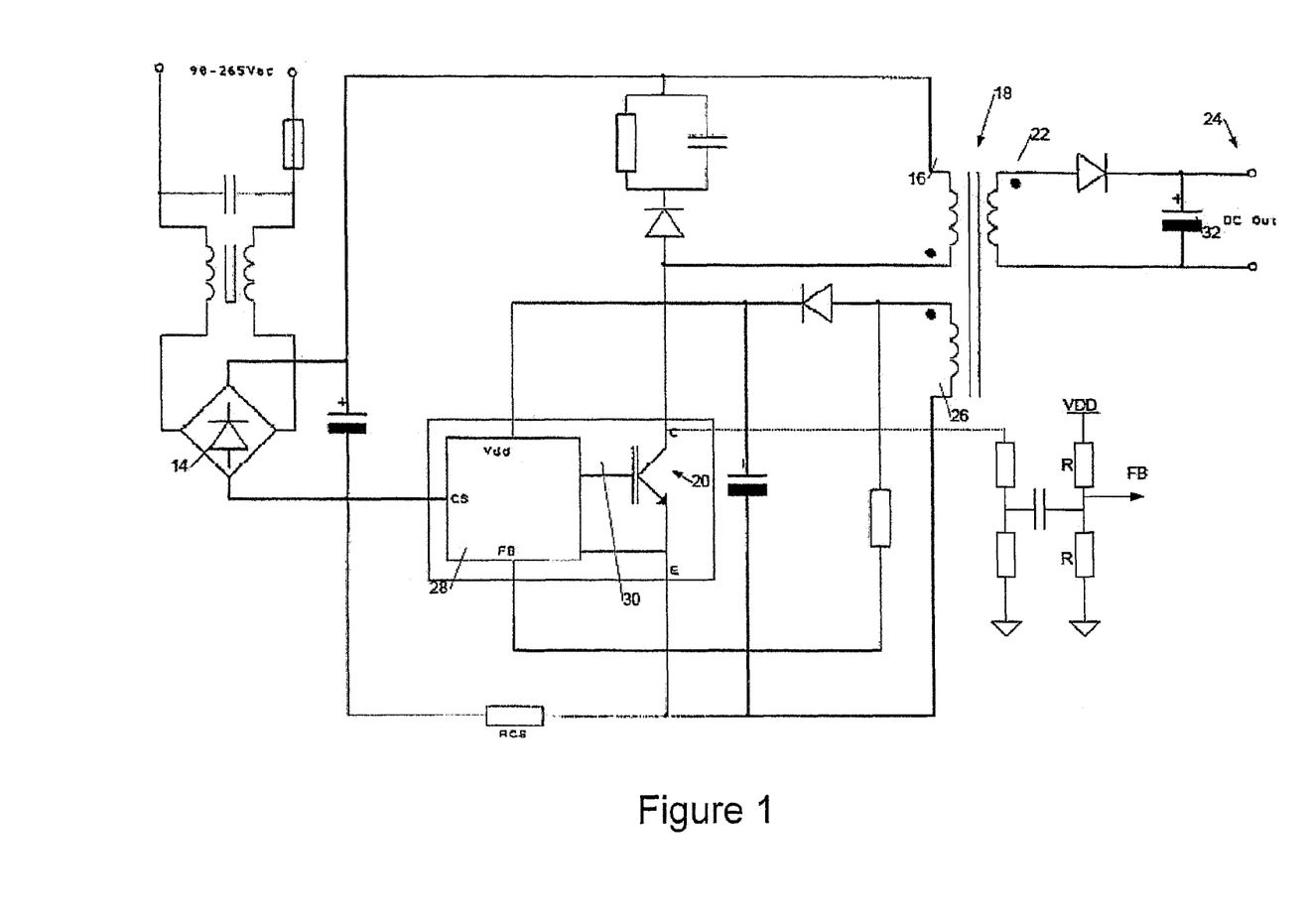
FIG. 1 shows an example of an SMPS incorporating primary side sensing.

Referring now to FIG. 1, this shows an example of a SMPS circuit with, merely for example, primary side sensing. The power supply comprises an AC mains input coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportionally to the voltage on secondary winding 22. This feedback signal provides an input to a control system 28, powered by the input voltage, e.g., VDD. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit. As can be seen, the primary side controlled SMPS of FIG. 1 derives feedback information from the primary side of the transformer, using an auxiliary winding to avoid high voltage signals, the voltage being stepped down by the turns ratio of the transformer. However, alternative techniques for the sensing may be used, e.g. secondary side sensing or other forms of primary side sensing (e.g., sensing a voltage of the primary winding, preferably capacitor coupled so that it can be referenced to the ground of the controller and stepped down using a potential divider, as shown by the inset example circuit of FIG. 1 with a dashed connection to the primary winding 16), and thus the auxiliary winding of FIG. 1 may be omitted.

It may be desirable to set output quantities on an SMPS—voltage, current or power—by the corresponding references in a control loop. These could be fixed or programmable. In certain applications it may further be desirable to change these references while the SMPS is in operation without disturbing the operation of the unit. With an SMPS incorporating an isolation power transformer, the demand for change in the control reference (voltage, current or power) may originate on the secondary (isolated) side of the transformer. If the control loop of such an SMPS utilizes a Primary Side Sensing Controller (PSSC) to control the power (i.e., primary) switch, a separate isolated interface to the PSSC could communicate a demand for change in the control reference(s). Furthermore, it may be desirable to communicate "housekeeping" data (e.g., device temperature, device identification and/or power levels etc.) from the primary (mains side) to the secondary side of the SMPS. Further still, it may be desirable for information to be communicated across the isolation barrier of an SMPS in either direction. The communication could be of analogue or digital format.

Typically, isolation in a communication interface of an SMPS is provided using communication transformer(s) or opto-isolators. Utilizing such isolation devices and the associated components generally results however in an increase in the component count and overall increased cost of the SMPS. This becomes a disadvantage where the design objective is a cost effective and/or programmable output, mains isolated SMPS, for example.

We will describe techniques for providing serial communication using a main power transformer of various types of SMPS (e.g., flyback or forward, using primary side and/or secondary side sensing, single ended and/or using discontinuous mode operation), for example for providing communication between electrically isolated primary and secondary sides at lower cost, reduced component count and/or circuit complexity, increased reliability, etc.

For use in understanding the present invention, the following disclosures are referred to:
U.S. Pat. No. 5,798,913, Tiesinga Jan et al, Philips Corp, date of patent Aug. 25, 1998;
U.S. patent application US2005/0270001 A1, Jitaru Ionel D, Det International Holding Limited, publication date Dec. 8, 2005;
U.S. patent application US2013/0251140 A1, Ransin Johannes G et al, Agere Systems LLC, publication date Sep. 26, 2013;
International patent application, publication number WO2007/005825 A2, Hershbarger Russell, Teridian Semiconductor Corp, publication date Jan. 11, 2007;
DE102012201640, Zelder Thomas et al, PANASONIC CORP, publication date Aug. 8, 2013.

SUMMARY

According to a first aspect of the present invention, there is provided a switched mode power converter (SMPC) having an isolation transformer for power transfer from a primary side to a secondary side of the SMPC and having a communication circuit for data communication between the primary side and the secondary side, the SMPC comprising: a transformer having a primary winding and a secondary winding, wherein the primary side comprises the primary winding coupled to receive power from an input to said SMPC and the secondary side comprises the secondary winding coupled to provide power to an output circuit comprising a load; a primary switch coupled in series with the primary winding; and a primary switch controller configured to control each of a first and a subsequent power transfer cycle of the SMPC by controlling the primary switch ON for an ON time period to allow a first energy transfer from the input to the transformer and then controlling the primary switch OFF for an OFF time period such that energy is transferred from the transformer to the output circuit, wherein the ON time period of the subsequent power transfer cycle starts at a time delay after the end of the energy transfer from the transformer to the output circuit of the first power transfer cycle, wherein the communication circuit comprises: a transmission winding and a reception winding magnetically coupled to the transmission winding, wherein one of the transmission winding and the reception winding comprises the secondary winding of the transformer and the other one of the transmission winding and the reception winding is on the primary side of the SMPC; a communication switch coupled in series with the transmission winding; a communication controller to control the communication switch to allow charge flow through the transmission winding during at least part of the time delay; and a detector coupled to receive a signal from the reception winding to thereby detect data transmitted from the transmission winding, said signal indicating the charge flow through the transmission winding.

(We note that the terms SMPS (switch mode power supply) and SMPC (switch mode power converter) are used interchangeably throughout this specification).

Apart from the main functions of a transformer, e.g., providing electrical isolation and transferring power between its windings, the main power transformer in the SMPC of an embodiment may thus also be used as communication medium. This may obviate the need for an additional isolation component dedicated to the communication channel(s), thereby reducing the component count of the system in embodiments. A separate communications path, e.g., using opto-coupler(s) or dedicated communication transformer(s), may not be necessary for communication between the primary and secondary sides. A serial communication channel provided in an embodiment using the main transformer can be used as part of a control loop of the SMPC or/and for transferring commands and/or converter status information to and/or from an external device or system. Various modulation and detection techniques may be implemented in such an embodiment for one-way or two-way communication.

Due to the nature of the transformer and the power conversion process the communication is preferably of a digital form. The data may originate in the SMPC, or may be provided through an external interface such as a USB port or a user interface. Thus, an embodiment may for example allow an electronic product to which power is being supplied, or a user, to communicate to the secondary side a desired parameter, e.g., desired output voltage of the SMPS, and for this to be communicated via a mains transformer to the primary side for corresponding control, e.g., of the primary side switch.

A preferred embodiment provides a serial communication system using as communication medium the main power transformer in a preferably single ended SMPC, for example wherein a primary switch controller terminates an ON period when a desired primary winding peak current is reached. The SMPC may be operating in discontinuous current mode such that an idle period preceding each ON period of a primary switch may correspond to the time delay. In a flyback converter typically the idle period will comprise resonant ringing due to the inductance of the transformer and parasitic capacitances (typically across the primary switch and/or the rectifier (e.g., diode) on the secondary side). In a forward converter however the idle period may not have any ringing. In either the forward or flyback case having discontinuous operation, idle periods will generally occur to allow output power to be adjusted while energy is transferred at a substantially fixed frequency, e.g., the primary switch is switched at a given frequency however at varying duty cycle. Where the SMPC is operating in continuous current mode, the continuous conduction mode may be interrupted such that the SMPC operates temporarily in discontinuous conduction mode and communication can occur during a time delay before CCM operation is resumed.

Preferably, the SMPC is configured to generally block current flow to the secondary winding from the output circuit, e.g., by means of a rectifier coupled in series with the secondary winding and the output circuit. Such a rectifier may be a synchronous rectifier (e.g., comprising a switch such as a MOSFET) or a diode. Such current flow may however be allowed temporarily under control of a communication switch of an embodiment for transmitting data to the primary side.

There may further be provided the SMPC, wherein the communication controller is configured to control the communication switch to modulate an idle ring of the transformer to thereby communicate said data, the idle ring occurring after the OFF period of the first power transfer cycle and before the ON period of the subsequent transfer cycle. Such an 'idle ring' of the transformer may be excited in the transformer when current from the secondary winding to the output circuit is blocked while the primary switch is off, this resulting in resonance due at least in part to the inductance of the transformer and parasitic capacitances of the SMPC.

In such an SMPC, the modulation may comprise phase modulation and the detector configured to detect a delay in the idle oscillation, or an interruption in the idle ring transient, to thereby detect said data. Additionally or alternatively, the modulation may comprise amplitude modulation and the detector configured to detect a change of amplitude of the idle ring to thereby detect said data.

Figure 3:
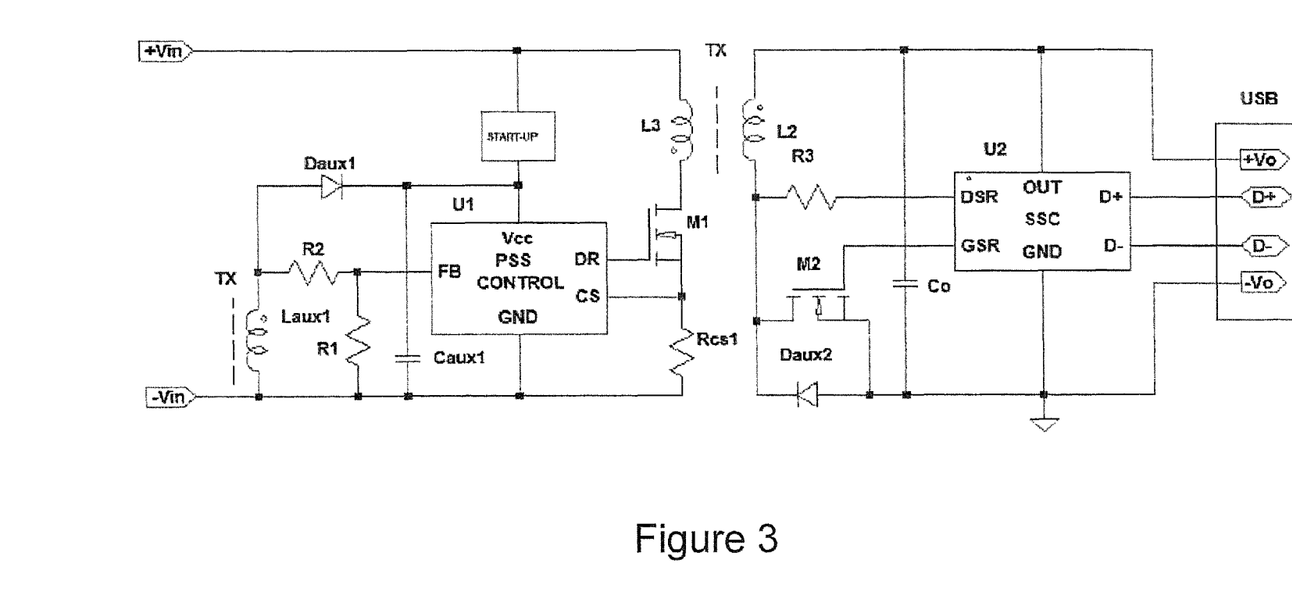
FIG. 3 shows a fly-back converter embodiment with a transformer serial communication system using idle ring (IR) modulation.
Figure 5:
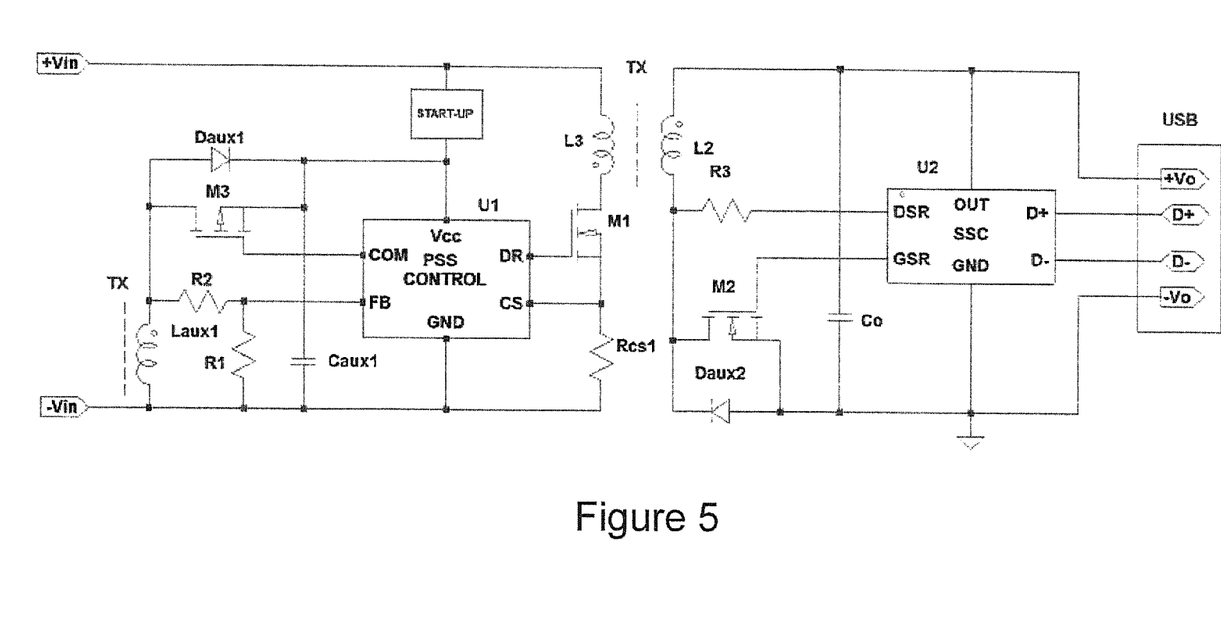
FIG. 5 shows an embodiment for two-way serial communication via the main transformer.

Current through the communication switch may be derived from the output circuit, (e.g., from capacitor Co in FIGS. 3 and 5). It is noted however that the period of time that the communication switch is on for is generally very short compared to an OFF period. The average current in the communication switch is correspondingly low, and therefore operation of the communication circuit does not have a significant effect on power transfer by the SMPC. The communication switch preferably has an average current rating of no more than 5 mA, 10 mA or 20 mA. Similarly, the communication switch may be guaranteed to operate with a maximum peak current of no more than 100 mA. Further in this regard, the ON duration of the communication switch is generally very short, e.g., less than or equal to 10 nS, 50 nS or 100 nS. This may depend on the parasitics of the SMPC and thus idle ringing frequency (e.g., 500 kHz to 1.5 MHz) and primary switch switching frequency (e.g., 40 to 100 kHz).

A communication switch on the secondary side may not be a dedicated switch and may be provided in the form of a switch also provided for synchronous rectification (instead of using a diode as the secondary side rectifier).

There may further be provided the SMPC, having a said communication circuit for communication from the secondary side to the primary side, wherein the transmission winding comprises the secondary winding and the reception winding is on the primary side. The reception winding may be an extra winding provided to pick up the communication signal from the transmission winding, or may be a winding provided for another purpose. For example, the SMPC may comprise an auxiliary power supply circuit coupled to the input to the SMPC, the auxiliary power supply circuit comprising an auxiliary winding coupled to power the primary switch controller, wherein the reception winding of said communication circuit for communication from the secondary side to the primary side comprises said auxiliary winding. The reception winding is magnetically coupled to the transformer.

There may further be provided the SMPC, having a said communication circuit for communication from the primary side to the secondary side, wherein the transmission winding is on the primary side and the reception winding comprises the secondary winding. The data transmitted from the primary side may originate in the primary side and/or indicate at least one of a primary side temperature, an input power to the SMPC (assisting for example failure identification on the secondary side if power out is far less than input power), an identification code of the SMPC (e.g., a serial number, e.g., to allow the load to know that it is corrected to the correct power supply and operate or cease operation accordingly) and a security code (e.g., password, for allowing use of the load apparatus with the SMPC, e.g., a manufacturer's password). The transmission winding may be an extra winding provided to send the communication signal to the reception winding, or may be a winding provided for another purpose. For example, an SMPC may comprise an auxiliary power supply circuit coupled to the input to the SMPC, the auxiliary power supply circuit comprising an auxiliary winding coupled to power the primary switch controller, wherein the transmission winding of said communication circuit for communication from the primary side to the secondary side comprises said auxiliary winding. The transmission winding is magnetically coupled to the transformer.

There may further be provided the SMPC having both a communication circuit for communication from the secondary side to the primary side as described above and a communication circuit for communication from the primary side to the secondary side as described above. The communication circuits may comprise components in common, i.e., are not separate circuits.

There may further be provided the SMPC, comprising a circuit for communication from the primary side to the secondary side, the circuit configured to modulate a said ON time period according to data to be transmitted, the SMPC comprising a detector to assess, e.g., measure and/or compare to a threshold value, a duration of a signal on the secondary winding to thereby detect said data, wherein the signal on the secondary winding comprises at least one of: a conduction time period of the secondary winding, the conduction time period starting when the primary winding stops conducting, i.e., at the end of the primary conduction interval (this may coincide with a voltage polarity change on the secondary winding), and extending to the start of an idle ring of the transformer; a time period of a reverse voltage on the secondary winding (noting that the transformer windings are arranged to provide voltage on the secondary winding having opposite sign to the voltage on the primary winding), the time period of the reverse voltage extending from the end of an idle ring of the transformer to a polarity change of the voltage on the secondary winding. The assessment may be performed by detecting at least one minimum, maximum and/or zero-crossing point in the idle ring, to thereby time a duration of at least one half-cycle of the ringing and compare the timed duration to a threshold value, and/or to thereby judge the duration relative to a reference timed duration. The threshold value or reference time duration may be stored parameters or may depend on previous assessments of duration of at least one half cycle of the idle ring.

The SMPC may be a flyback or forward converter. Preferably, the SMPC operates in discontinuous current mode, or at least is controlled to a have a time window, i.e., the time delay, for the data communication.

The SMPC may be comprised in or form a power supply for a solid state light emission device such as a light emitting diode (LED) or OLED, the power supply comprising the SMPC having the communication circuit for communication from the secondary side to the primary side, preferably wherein the secondary side of the SMPC comprises a brightness control input, e.g., user input, the communication controller of the SMPC configured to perform said communication switch control to transmit data to the primary side according to the brightness control input, the primary switch controller configured to vary at least one said ON time period dependent on the data detected from the reception winding. Thus, a solid state lighting power supply having substantially all control on the primary side may nevertheless receive at the secondary side, and act upon, an end device or user request to change at least one light level.

The SMPC may be comprised in or form a charger for charging a device (e.g., mobile phone, tablet) through a USB interface, the charger having the communication circuit for communication from the secondary side to the primary side, preferably wherein the secondary side of the SMPC comprises a voltage control input (e.g., parallel or serial digital input to allow the device to communicate the optimum device supply voltage to the charger), the communication controller of the SMPC configured to perform said communication switch control to transmit data to the primary side according to the voltage control input, the primary switch controller configured to vary at least one said ON time period dependent on the data detected from the reception winding. Thus, for example an end device may communicate to the charger secondary side that it requires an internal supply voltage of only 5V (rather than, e.g., 12V), and the charger having all control on the primary side may adjust the charger output voltage correspondingly. This may allow a charger to adapt to different types of device.

The SMPC may be a converter having programmable output, e.g., in the form of an envelope tracking power converter, comprising the SMPC having the communication circuit for communication from the secondary side to the primary side, preferably wherein the secondary side of the SMPC comprises a waveform control input, the communication controller of the SMPC configured to perform said communication switch control to transmit data to the primary side according to the waveform control input, the primary switch controller configured to vary at least one said ON time period dependent on the data detected from the reception winding. Such a converter may follow an input waveform, thus providing improved power efficiency.

Similarly, the SMPC may be comprised in or form a power supply for a home appliance, e.g., TV, washing machine, fridge, etc., the power supply comprising the SMPC having the communication circuit for communication from the secondary side to the primary side.

In view of the above, embodiments may be of advantage where the SMPC has primary side control, e.g., by means of secondary side sensing or, more preferably primary side sensing. Thus, the primary switch controller may control the ON period start and/or duration dependent on an input from a primary side auxiliary winding of the isolation transformer. Embodiments may be advantageous for implementing SMPCs with programmable output, the output adjusted by the primary switch controller according to an programming input, even where the primary switch controller uses primary side sensing.

According to a second aspect of the present invention, there is provided a method for transferring information between primary and secondary sides of a switched mode power converter (SMPC), the SMPC having an isolation transformer for power transfer from the primary side to the secondary side and having a communication circuit for data communication between the primary side and the secondary side, the SMPC comprising: a transformer having a primary winding and a secondary winding, wherein the primary side comprises the primary winding coupled to receive power from an input to said SMPC and the secondary side comprises the secondary winding coupled to provide power to an output circuit comprising a load; a primary switch coupled in series with the primary winding; and a primary switch controller configured to control switching of the primary switch to thereby control power transfer cycles of the SMPC; wherein the method comprises: controlling each of a first and a subsequent power transfer cycle of the SMPC by controlling the primary switch ON for an ON time period to allow a first energy transfer from the input to the transformer and then controlling the primary switch OFF for an OFF time period such that energy is transferred from the transformer to the output circuit, said controlling such that the ON time period of the subsequent power transfer cycle starts at a time delay after the end of the energy transfer from the transformer to the output circuit of the first power transfer cycle; switching a current through a transmission winding during at least part of the time delay, said switching according to data to be transmitted; receiving at a reception winding a signal from the transmission winding; and demodulating the received signal to thereby detect the data transmitted from the transmission winding, wherein one of the transmission winding and the reception winding comprises the secondary winding of the transformer and the other one of the transmission winding and the reception winding is on the primary side of the SMPC.

There may further be provided the method, wherein the communication controller controls the communication switch to modulate an idle ring of the transformer to thereby communicate said data, the idle ring occurring after the OFF period of the first power transfer cycle and before the ON period of the subsequent transfer cycle.

In such a method, the modulation may be phase modulation and the detector detects a delay in the idle oscillation, or an interruption in the idle ring transient, to thereby detect said data. Additionally or alternatively, the modulation may be amplitude modulation and the detector is detects a change of amplitude of the idle ring to thereby detect said data.

There may further be provided the method, wherein the transmission winding comprises the secondary winding and the reception winding is on the primary side, the method comprising communicating said data from the secondary side to the primary side by means of said switching, receiving and demodulating steps. Such an embodiment may use an auxiliary winding of an auxiliary power supply circuit coupled to the input to the SMPC to power the primary switch controller, wherein the reception winding comprises the auxiliary winding.

There may further be provided the method, wherein the reception winding comprises the secondary winding and the transmission winding is on the primary side, the method comprising communicating said data from the primary side to the secondary side by means of said switching, receiving and demodulating steps. Such an embodiment may use an auxiliary winding of an auxiliary power supply circuit coupled to the input to the SMPC to power the primary switch controller, wherein the transmission winding comprises the auxiliary winding.

There may further be provided the method, comprising both the above defined communicating data from the secondary side to the primary side and the above defined communicating data from the primary side to the secondary side.

There may further be provided the method, comprising communicating data from the primary side to the secondary side, the communicating comprising modulating a said ON time period according to data to be transmitted, assessing a duration of a signal on the secondary winding to thereby detect said data, wherein the signal on the secondary winding comprises at least one of: a conduction time period of the secondary winding, the conduction time period starting when the primary winding stops conducting, i.e., at the end of the primary conduction interval, and extending to the start of an idle ring of the transformer; a time period of a reverse voltage on the secondary winding, the time period of the reverse voltage extending from the end of an idle ring of the transformer to a polarity change of the voltage on the secondary winding.

Preferably, the SMPC operates in discontinuous current mode.

According to a third aspect of the present invention, there is provided a switched mode power converter (SMPC) having an isolation transformer for power transfer from a primary side to a secondary side of the SMPC and having a communication circuit for data communication between the primary side and the secondary side, the SMPC comprising: a transformer having a primary winding and a secondary winding, wherein the primary side comprises the primary winding coupled to receive power from an input to said SMPC and the secondary side comprises the secondary winding coupled to provide power to an output circuit comprising a load; a primary switch coupled in series with the primary winding; and a primary switch controller configured to control each of a first and a subsequent power transfer cycle of the SMPC by controlling the primary switch ON for an ON time period to allow a first energy transfer from the input to the transformer and then controlling the primary switch OFF for an OFF time period such that energy is transferred from the transformer to the output circuit, wherein the primary switch controller is configured to control the ON time period of the subsequent power transfer cycle to start at a time delay after the end of the OFF time period of the first power transfer cycle, wherein the communication circuit comprises: means for controlling each of a first and a subsequent power transfer cycle of the SMPC by controlling the primary switch ON for an ON time period to allow a first energy transfer from the input to the transformer and then controlling the primary switch OFF for an OFF time period such that energy is transferred from the transformer to the output circuit, said controlling such that the ON time period of the subsequent power transfer cycle starts at a time delay after the end of the energy transfer from the transformer to the output circuit of the first power transfer cycle; means for switching a current through a transmission winding during at least part of the time delay, said switching according to data to be transmitted; means for receiving at a reception winding a signal from the transmission winding; and means for demodulating the received signal to thereby detect the data transmitted from the transmission winding, wherein one of the transmission winding and the reception winding comprises the secondary winding of the transformer and the other one of the transmission winding and the reception winding is on the primary side of the SMPC.

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Embodiments are described below generally with regard to features of a flyback converter for example. However, principles of embodiments as described herein are applicable to various converter topologies, preferably in any topology where there is an idle interval in the switching cycle of an isolated converter such that the main isolation transformer may be used for communications. Thus, for example, serial communication via the main transformer in a single ended forward converter may be implemented.

Preferred embodiments are applicable to a single ended SMPC operating in Discontinuous Current Mode (DCM), where an Idle Interval (II) (or pause) is present in preferably each switching cycle of the SMPC, following the active interval of energy transfer through the power transformer. The control system of the SMPC may consist of a primary switch controller performing control based on primary side sensing (i.e., a Primary Side Sensing Controller (PSSC)) and a Secondary Side Circuit (SSC). Advantageously, both the PSSC and the SSC may be capable of coding, de-coding, transmitting and receiving digital information through the transformer, thereby facilitating half-duplex communication. The transmitters and the receivers in the SSC and in the PSSC, and the isolation transformer further will be referred to as Communication System (CS). The idle interval in each switching cycle is used by the CS to transmit and receive data preferably in the form of binary, e.g., one or more bits, of information.

Figure 2:
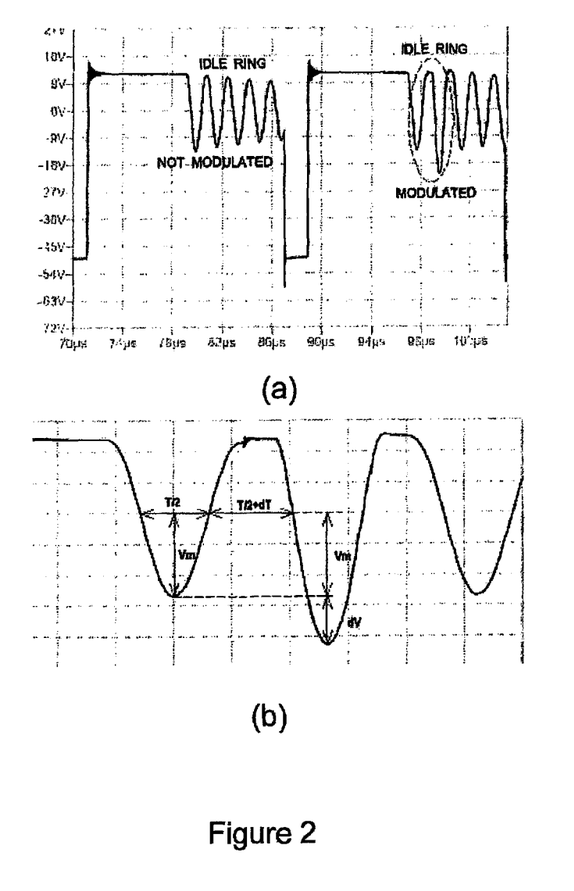
FIG. 2 shows idle ring oscillation modulation of an embodiment.

In one embodiment of the digital CS, the information is transmitted in one direction only—from SSC to PSSC. The SSC incorporates a transmitter capable of coding information and transmitting it via the transformer. The PSSC incorporates a receiver capable of receiving and interpreting the information on the primary side of the transformer. Notionally, to transmit bit "ONE or HIGH" the SSC modulates the idle ring (IR) in the transformer. Alternatively, if the IR is left un-modulated for a switching cycle, a bit "ZERO or LOW" is said to have been transmitted during that cycle. Communication protocol can be deployed as appropriate to facilitate the transfer of data or instructions. FIG. 2a) shows two subsequent cycles of the voltage across a winding of a fly-back converter, e.g., on the drain node of M1 (FIGS. 3, 5). The idle ring oscillation in the first cycle is not modulated, whereas in the second cycle it has been modulated. FIG. 2b) shows the modulated idle ring in greater detail. It is evident that the damped sine-wave of the idle ring in the first of the two cycles has been subjected to a phase modulation in the second cycle. Notably, the first positive half cycle of the modulated waveform in FIG. 2b) has longer duration (T/2+dT) compared to the preceding negative half cycle of the waveform (T/2). If no modulation is applied the positive and the negative half cycles of the idle ring waveform would have the same duration (T/2). The idle ring oscillation could be modulated on one side of the transformer and the modulation could be detected on the opposite side.

Regarding an example implementation, FIG. 3 shows a fly-back converter where switch M2 on the secondary side of the transformer is used to modulate the idle ring of the transformer. M2 is driven by U2 (SSC), which detects the presence and the phase of the idle ring and modulates it according to the data received on the USB port. U1 (PSSC) contains the circuitry required to detect and de-code the serial data transmitted through the transformer by U2. The idle ring may occur when M1 is off and the rectifier (diode Daux2) has entered the blocking state) as energy in the resonant circuit comprising the transformer and parasitic capacitances dissipates. Such an idle ring may be interrupted by temporarily turning communication switch M2 ON.

FIG. 3 shows, in more detail, an SMPC with an isolation transformer TX having primary winding L3 and secondary winding L2, the primary side comprising the components between the input +−Vin to the SMPC and the primary winding, primary switch M1 and impedance Rcs1, inclusive. The secondary side comprises the components between the SMPC output +−Vo, in this case embodied within a USB port, and the secondary winding, inclusive. The primary side includes the primary switch controller U1. Data received from outside the SMPC, e.g., on a USB port as shown in FIG. 3, may be transmitted by the SMPC using a serial transformer communication technique as described herein, the data in the example of FIG. 3 being communicated from secondary to primary side. This may be achieved by a communication circuit comprising, in FIG. 3, a transmission winding in the form of L2, a reception winding in the form of Laux1, communication switch M2 (which may be part of a synchronous rectifier of the SMPC), communication controller U2, and detector which in this case is provided within U1 coupled to Laux1 but may be separate from U1. Laux1 may be an auxiliary winding of a circuit for providing auxiliary power to the primary switch controller U1.

Figure 4:
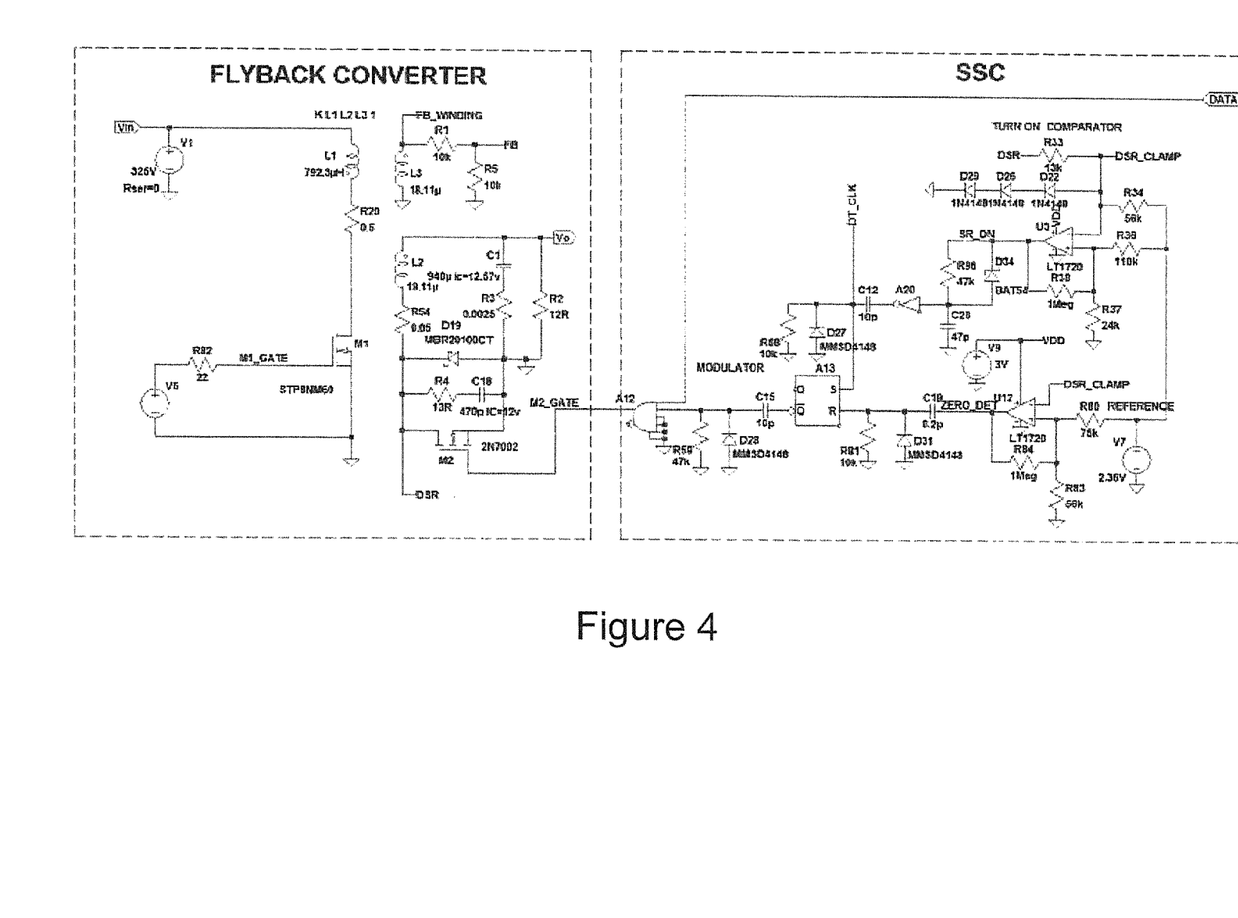
FIG. 4 shows a basic LTSPICE model of a 12V/1 A fly-back converter and secondary side circuit (SSC) of an embodiment.

Similarly, FIG. 4 shows a LTSPICE model of 12V/1 A fly-back converter and SSC.

Regarding alternative embodiments, it is evident from the example waveform of FIG. 2b) that the phase modulated idle ring waveform may exhibit an amplitude modulation as a by-product. The second negative half cycle has a magnitude Vm+dV, whereas the preceding negative half cycle has lower magnitude (Vm). In an undisturbed (not modulated) idle ring the magnitude decreases exponentially every cycle/half-cycle. Therefore amplitude demodulation could be deployed on the receiver side of the transformer to receive and decode the serial information transmitted through the transformer.

Two-way communication may for example be implemented as shown in FIG. 5, which shows a fly-back converter where switches M2 and M3 are used to modulate the idle ring of the transformer on the secondary and the primary side of the transformer respectively. M1 is controlled by U1 (PSSC) and M2 is controlled by U2 (SSC). Both PSSC and SSC have the capability to modulate and de-modulate the idle ring oscillation as well as to encode, transmit, receive and decode information following a predetermined protocol. Thus a 2-way serial communication channel through the main transformer is established, between the primary and the secondary part of the control system of the converter. Apart from communicating to the PSSC the SSC is also able to communicate to an external device (e.g. using the lines D+ and D− of a USB interface), receiving enable/disable commands, power reference levels etc., and providing converter status information to an external device or system. Secondary to primary communication may be achieved in FIG. 5 in a similar manner as discussed for FIG. 3. Primary to secondary communication may be achieved in FIG. 5 by switching M3 ON to thereby discharge Caux1 into Laux1 and thereby transmit a signal to the secondary side.

Figure 6:
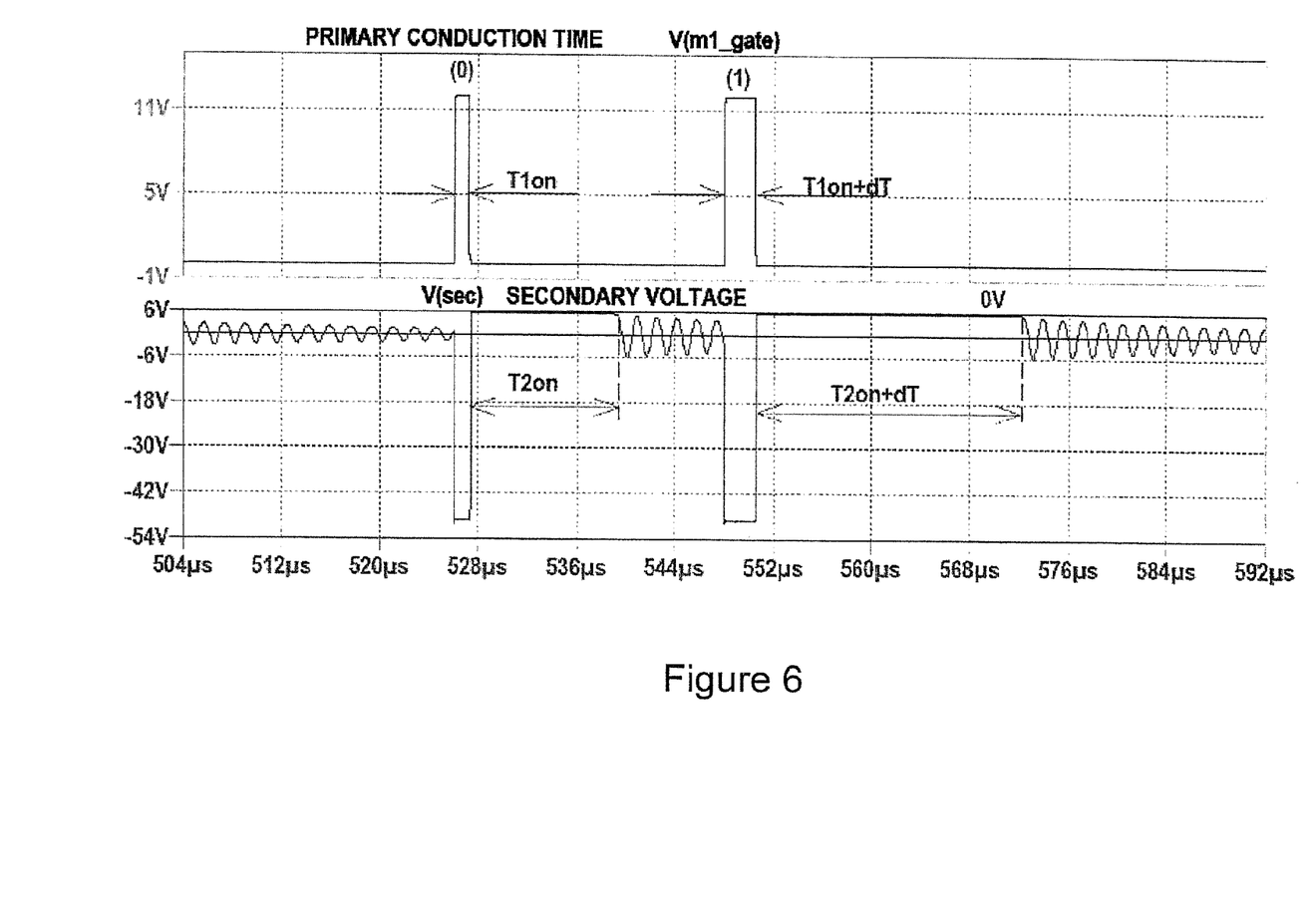
FIG. 6 shows an example of primary ON-time modulation waveforms.

Primary to secondary communication may alternatively be achieved by modulating the primary conduction time. In other words, primary-to-secondary communication could be accomplished by modulating the ON time of switch M1 (FIG. 5). The corresponding waveforms are shown in FIG. 6. Circuitry such as U2 may detect the modulation and decode the information. As indicated by the waveforms in FIG. 6, this could be achieved on the secondary side either by measuring the secondary conduction time T2 and/or by measuring the duration of the reverse voltage pulse across the secondary winding. While modulating the on-time of the main switch on the primary side may affect power-transfer operation of the converter, as the primary determines the on-time of the switch, the technique may nevertheless be advantageous in that it does not require an additional switch on the primary side dedicated to communication and thus may reduce cost for example.

In an embodiment, the primary conduction time modulation technique is used for primary to secondary communication and combined with idle ring communication for the secondary to primary communication channel in a two-way communication system.

In view of the above detailed description of embodiments and related drawings, an advantageous embodiment may provide an isolated SMPS where the main isolation power transformer (fly-back, forward etc.) is used for serial digital communication as well as for transferring electric power. Additionally or alternatively, an isolated SMPS may operate in Discontinuous Current Mode (DCM) and contain a communication system, where the communication system transmits one bit of information during the idle interval (the pause) in the switching cycle of the switched mode power converter. Additionally or alternatively, an isolated SMPS operating in DCM may contain a communication system, where the communication system transmits serial data by modulating the idle ring oscillation in the transformer.

Figure 7:
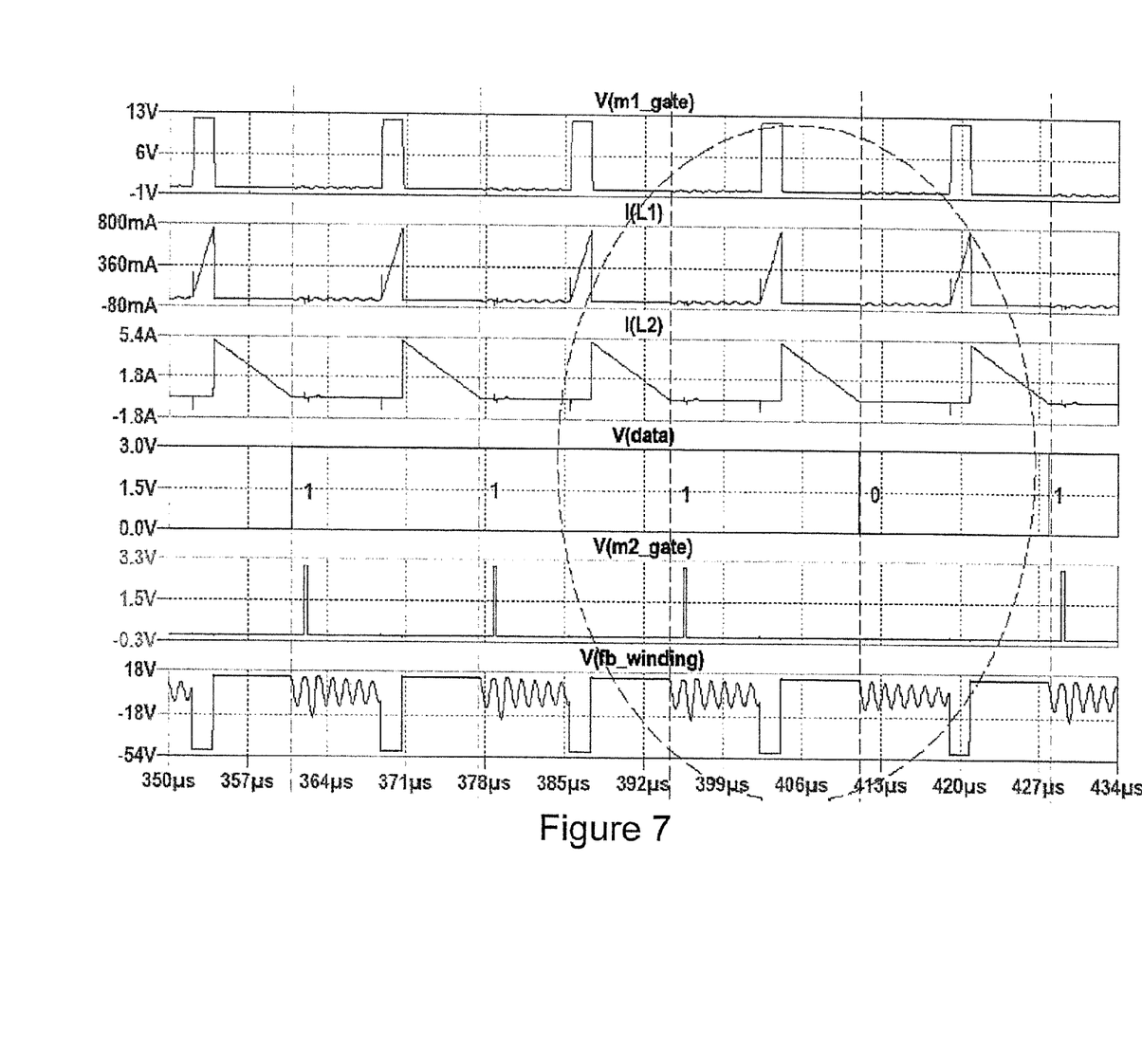
FIG. 7 shows waveforms for a flyback converter with serial transformer communication.

Further theoretical understanding of embodiments may be derived from the waveforms in FIG. 7 that illustrate a DCM operation of the fly-back converter depicted in FIG. 2, where one bit of information is transmitted from the secondary to the primary side of the converter during the pause in every conversion cycle. The main transformer is used as a communication medium, namely the IR during the pause is modulated. To be specific assume that modulated IR corresponds to high logic level (1) and the absence of modulation signifies low logic level (0). Also assume that the same byte of data (1110) is transmitted sequentially over every four consecutive switching cycles of the converter.

Figure 8:
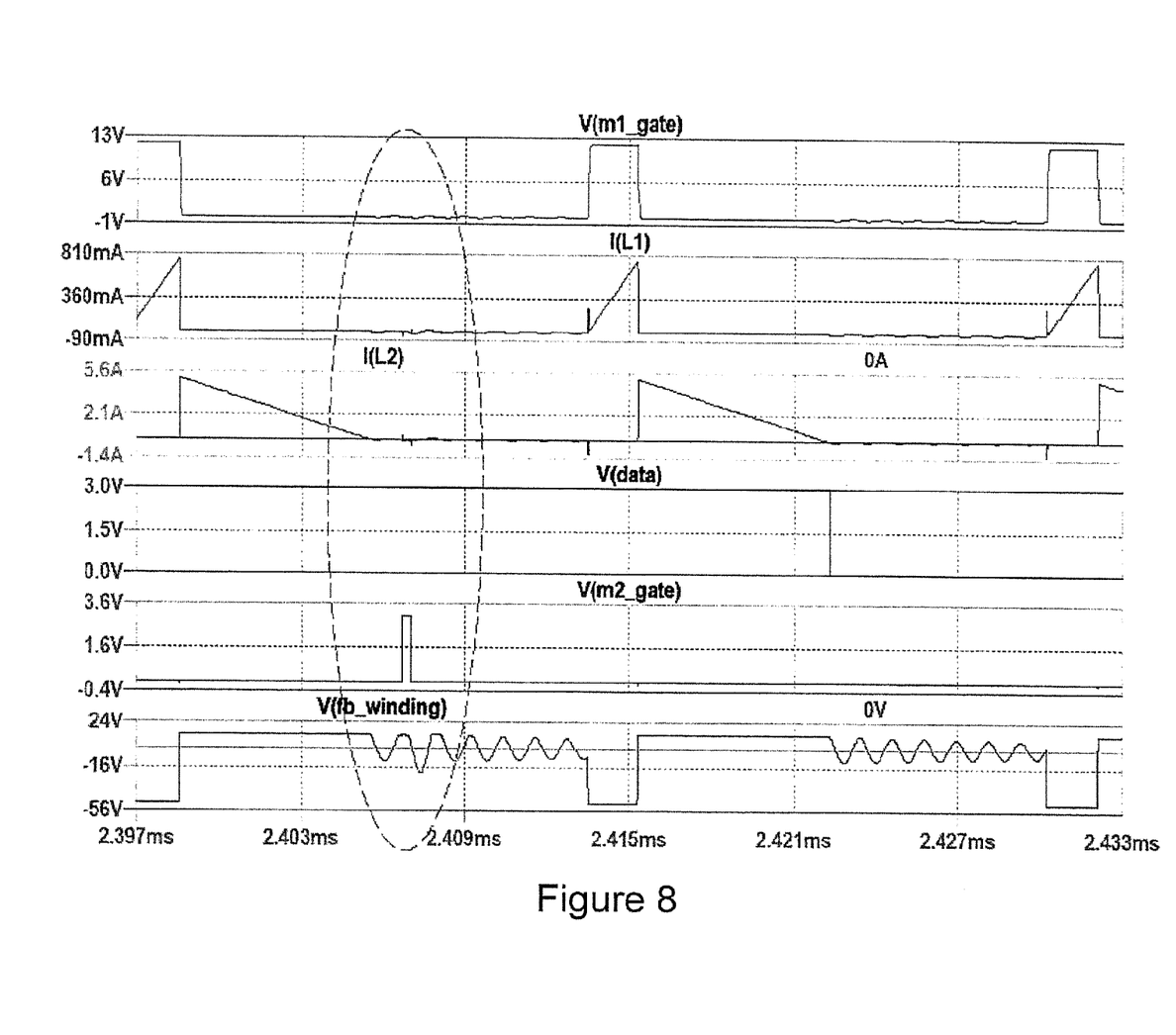
FIG. 8 shows waveforms for two consecutive switching cycles transmitting logic 1 and logic 0 respectively.

The same set of waveforms are shown in FIG. 8 in greater detail. Two consecutive cycles transmitting a 1 and a 0 are shown. A short gate drive pulse applied to M2 results in modulated IR when logic 1 is transmitted. The absence of such pulse at the next switching cycle leaves the IR without modulation thus signifying logic 0.

Figure 9:
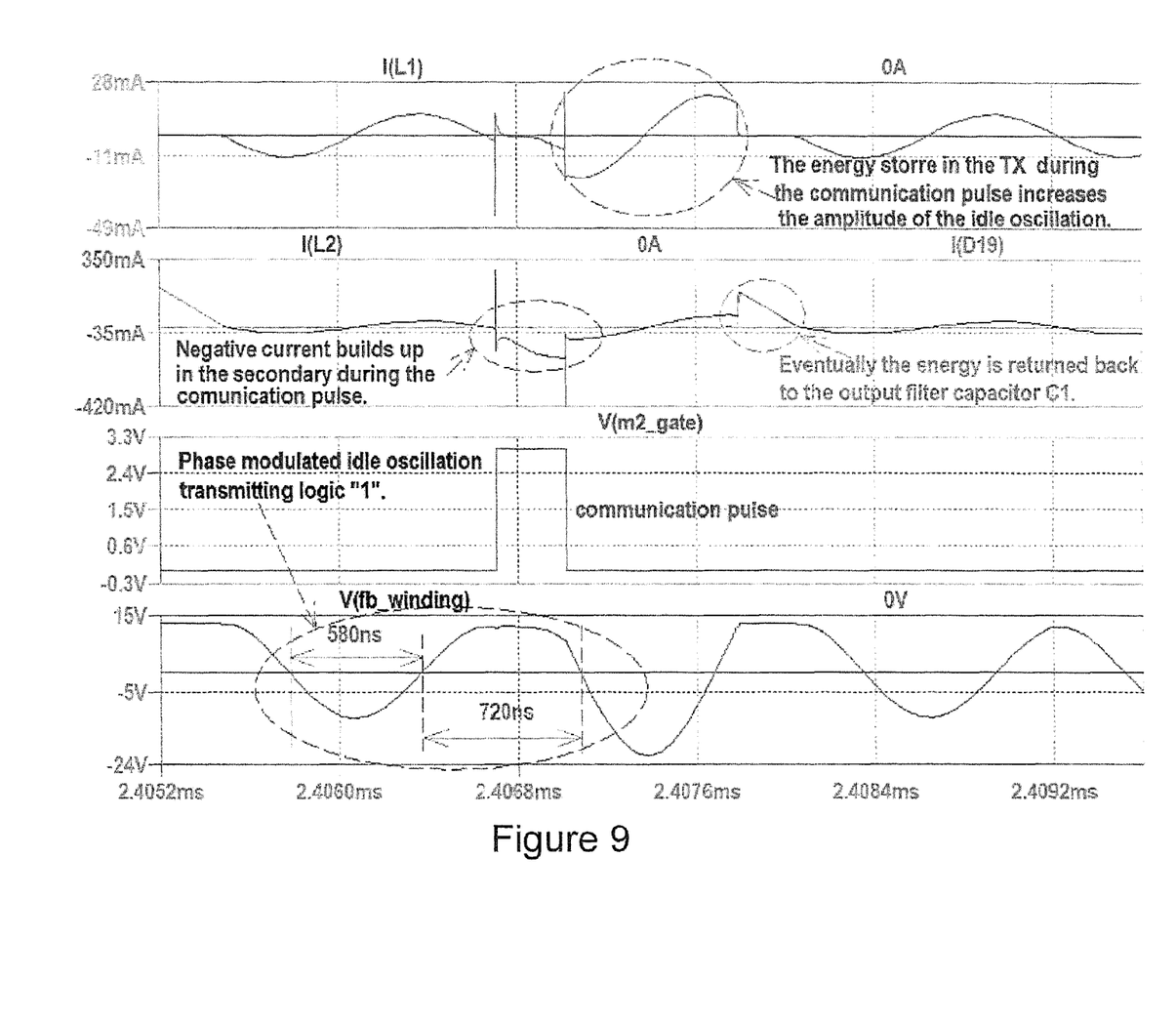
FIG. 9 shows waveforms indicating that energy used for modulation is partly recovered.

Even more detail waveforms illustrating the phase modulation of the IR during communication of logic 1 are shown in FIG. 9 representing two consecutive switching cycles transmitting logic 1 and logic 0 respectively. It is evident that the modulation results in an increase in the energy in the IR. However the bulk of this energy is recovered back in the output filter capacitor of the converter.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A switched mode power converter (SMPC) comprising:
   a primary side;
   a secondary side;
   an isolation transformer for power transfer from the primary side to the secondary side of the SMPC, the isolation transformer including:
      a primary-side winding coupled to receive power from a primary side input of the SMPC, and
      a secondary-side winding coupled to provide power to a secondary-side output of the SMPC;
   a primary-side power switch;
   a primary-side power switch controller configured to control the power transfer of the SMPC by controlling the switching of the primary-side power switch between an ON state and an OFF state, wherein during at least some switching cycles a time during which the primary-side power switch is in the OFF state includes a first portion during which current flows from the secondary-side winding to the secondary-side output and a second portion during which substantially zero current flows from the secondary-side winding to the secondary-side output, wherein the second portion of the time during which the primary-side power switch is in the OFF state includes an idle ring triggered by a transition from the first portion to the second portion; and a communication circuit for data communication between the primary side and the secondary side, wherein the communication circuit comprises:
- a secondary-side communication switch coupled to the secondary-side winding,
- a secondary-side communication controller to control switching of the secondary-side communication switch to modulate the idle ring of the isolation transformer and thereby communicate data, and
- a primary-side detector coupled to detect data communicated from the secondary-side winding.

2. The SMPC of claim 1, wherein the modulation is phase modulation and the primary-side detector is configured to detect a delay in the idle ring to thereby detect said data.

3. The SMPC of claim 1, wherein the modulation is amplitude modulation and the primary-side detector is configured to detect a change of amplitude of the idle ring to thereby detect said data.

4. The SMPC of claim 1, wherein the secondary-side communication switch has an average current rating of no more than 10 mA.

5. The SMPC of claim 1, wherein:
the SMPC further comprises a secondary-side output rectifier, wherein the secondary-side communication switch is coupled across the secondary-side output rectifier.

6. The SMPC of claim 1, wherein the primary-side detector is coupled to an auxiliary winding on the primary side, the auxiliary winding to receive the data communicated from the secondary-side.

7. The SMPC of claim 6, comprising an auxiliary power supply circuit coupled to the primary side input to the SMPC, the auxiliary power supply circuit coupled to use the auxiliary winding to power the primary switch controller.

8. The SMPC of claim 1, wherein the SMPC is to interrupt operation with continuous conduction switching cycles to operate temporarily with the at least some switching cycles that include the second portion during which substantially zero current flows from the secondary-side winding to the secondary-side output.

9. The SMPC of claim 1, wherein the SMPC is configured to operate in discontinuous conduction mode in which the second portion occurs in substantially all switching cycles.

10. The SMPC of claim 1, wherein the SMPC is a forward converter.

11. A charger for charging a device through a USB interface, the charger comprising:
a switch mode power converter (SMPC), the SMPC comprising:
a primary side;
a secondary side, wherein the secondary side of the SMPC comprises a voltage control input to receive data characterizing a desired output voltage of the SMPC;
an isolation transformer for power transfer from the primary side to the secondary side of the SMPC, the isolation transformer including:
a primary-side winding coupled to receive power form a primary side input of the SMPC; and
a secondary-side winding coupled to provide power to a secondary-side output of the SMPC;
a primary-side power switch;
a primary-side power switch controller configured to control the power transfer of the SMPC by controlling the switching of the primary-side power switch between an ON state and an OFF state, wherein during at least some switching cycles a time during which the primary-side power switch is in the OFF state includes a first portion during which current flows from the secondary-side winding to the secondary-side output and a second portion during which substantially zero current flows from the secondary-side winding to the secondary-side output, wherein the second portion of the time includes an idle ring triggered by a transition from the first portion to the second portion; and
a communication circuit for data communication between the primary side and the secondary side, wherein the communication circuit further comprises:
a secondary-side communication switch coupled to the secondary-side winding;
a secondary-side communication controller to control switching of the secondary-side communication switch to modulate the idle ring of the isolation transformer and thereby communicate data, wherein the secondary-side communication controller is to control the secondary-side communication switch to communicate data characterizing the desired output voltage to the primary side, the primary switch controller configured to control the power transfer of the SMPC in response to the data characterizing the desired output voltage; and
a primary-side detector coupled to detect data communicated from the secondary-side winding.

12. The charger of claim 11, wherein the USB interface includes the voltage control input.

13. A method for transferring information between primary and secondary sides of a switched mode power converter (SMPC), the SMPC comprising:
a primary side;
a secondary side;
an isolation transformer for power transfer from the primary side to the secondary side, the isolation transformer including:
a primary-side winding coupled to receive power from a primary-side input of the SMPC; and
a secondary-side winding coupled to provide power to a secondary-side output of the SMPC;
a primary-side power switch;
a primary-side power switch controller configured to control switching of the primary-side power switch to transfer power to the secondary side of the SMPCS; and
a communication circuit to communicate data from the secondary side to the primary side, wherein the communication circuit comprises:
a secondary-side communication switch coupled to the secondary-side winding;
a secondary-side communication controller to control switching of the secondary-side communication switch and thereby communicate data; and
a primary-side detector coupled to detect data communicated from the secondary-side winding, wherein the method comprises:
controlling power transfer from the primary side to the secondary side of the SMPC by controlling the switching of the primary-side power switch between an ON state and OFF state, wherein during at least some switching cycles a time during which the primary-side power switch is in the OFF state includes a first portion during which current flows from the secondary-side winding to the secondary-side output and a second portion during which substantially zero current flows from the secondary-side winding to the secondary-side output, wherein the second portion of the time includes an idle ring triggered by a transition from the first portion to the second portion;

the secondary-side communication controller switching the secondary-side communication switch to modulate the idle ring and communicate data from the secondary side to the primary side;

the primary-side detector detecting the switching of the secondary-side communication switch; and demodulating the detection of the switching.

14. The method of claim 13, wherein:
modulating the idle ring comprises phase modulating the idle ring; and
detecting the switching of the secondary-side communication switch comprises the primary-side detector detecting a delay in the idle ring.

15. The method of claim 13, wherein:
modulating the idle ring comprises amplitude modulating the idle ring; and
detecting the switching of the secondary-side communication switch comprises the primary-side detector detecting a change of amplitude of the idle ring.

16. The method of claim 13, wherein:
the method further comprises powering the primary switch controller using an auxiliary winding of an auxiliary power supply circuit coupled to the primary-side input to the SMPC; and
detecting the switching of the secondary-side communication switch comprises detecting the switching at the auxiliary winding.

17. The method of claim 13, wherein controlling the power transfer comprises operating the SMPC in a discontinuous conduction mode in which the second portion occurs in substantially all switching cycles.

18. The method of claim 13, further comprising interrupting operation with continuous conduction switching cycles and operating temporarily with the at least some switching cycles that include the second portion during which substantially zero current flows from the secondary-side winding to the secondary-side output.

19. A switched mode power converter (SMPC) comprising:
a primary side;
a secondary side;
an isolation transformer for power transfer from the primary side to the secondary side of the SMPC; the isolation transformer having a primary winding and a secondary winding, wherein the primary side comprises the primary winding coupled to receive power from an input to said SMPC and the secondary side comprises the secondary winding coupled to provide power to an output circuit comprising a load;
a primary-side power switch;
a primary-side power switch controller configured to control power transfer from the primary side to the secondary side of the SMPC by controlling the switching of the primary-side power switch between an ON state and an OFF state, at least some of the switching cycles including an idle interval during which substantially zero current flows from the secondary-side winding to the secondary-side output; and
a communication circuit for data communication from the secondary side to the primary side, wherein the communication circuit comprises:
means for modulating an idle ring that occurs during the idle interval by controlling switching of a secondary-side communication switch coupled to the secondary winding to modulate the idle ring of the isolation transformer and thereby communicate data;
means for detecting the modulation of the idle ring; and
means for demodulating the detected modulation of the idle ring.

20. The SMPC of claim 19, wherein:
the SMPC further comprises a secondary-side output rectifier, and
the means for modulating the idle ring is a switch coupled across the secondary-side output rectifier.

21. The SMPC of claim 19, wherein the SMPC is to interrupt operation with continuous conduction cycles to operate temporarily with the at least some of the switching cycles including the idle interval.

* * * * *

UNITED STATES PATENT AND TRADEMARK OFFICE
CERTIFICATE OF CORRECTION

PATENT NO. : 9,502,985 B2
APPLICATION NO. : 14/615862
DATED : November 22, 2016
INVENTOR(S) : Antonius Jacobus Johannes Werner et al.

Page 1 of 1

It is certified that error appears in the above-identified patent and that said Letters Patent is hereby corrected as shown below:

On the Title Page

Item (71), the Applicant "POWER INTEGRATIONS LIMITED, Grand Cayman, Cayman Islands" should be changed to --POWER INTEGRATIONS, INC., San Jose, CA (US)--.

Item (73), the Assignee "Power Integrations Limited, Grand Cayman, Cayman Islands" should be changed to --Power Integrations, Inc., San Jose, CA (US)--.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*